Jan. 6, 1959

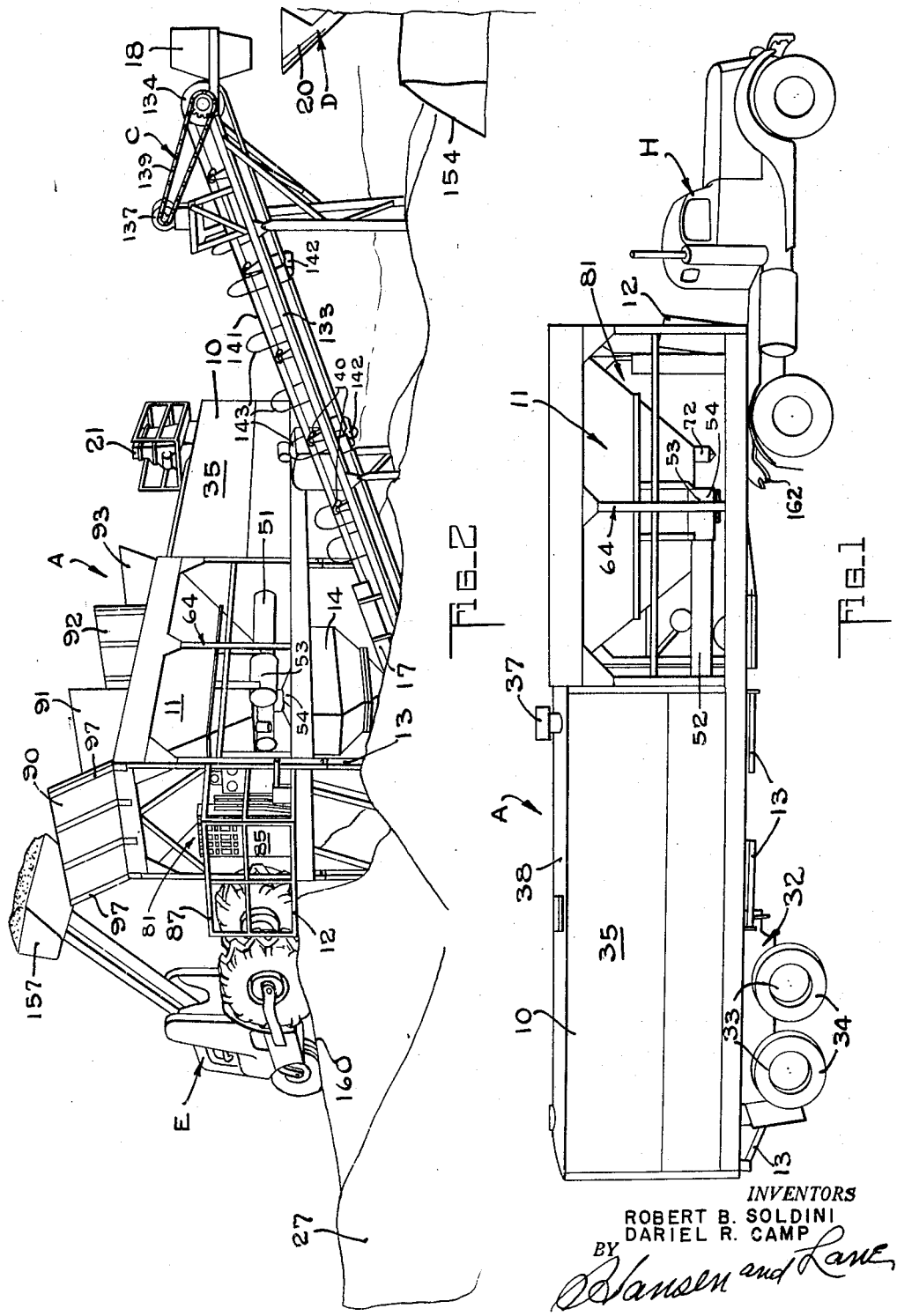

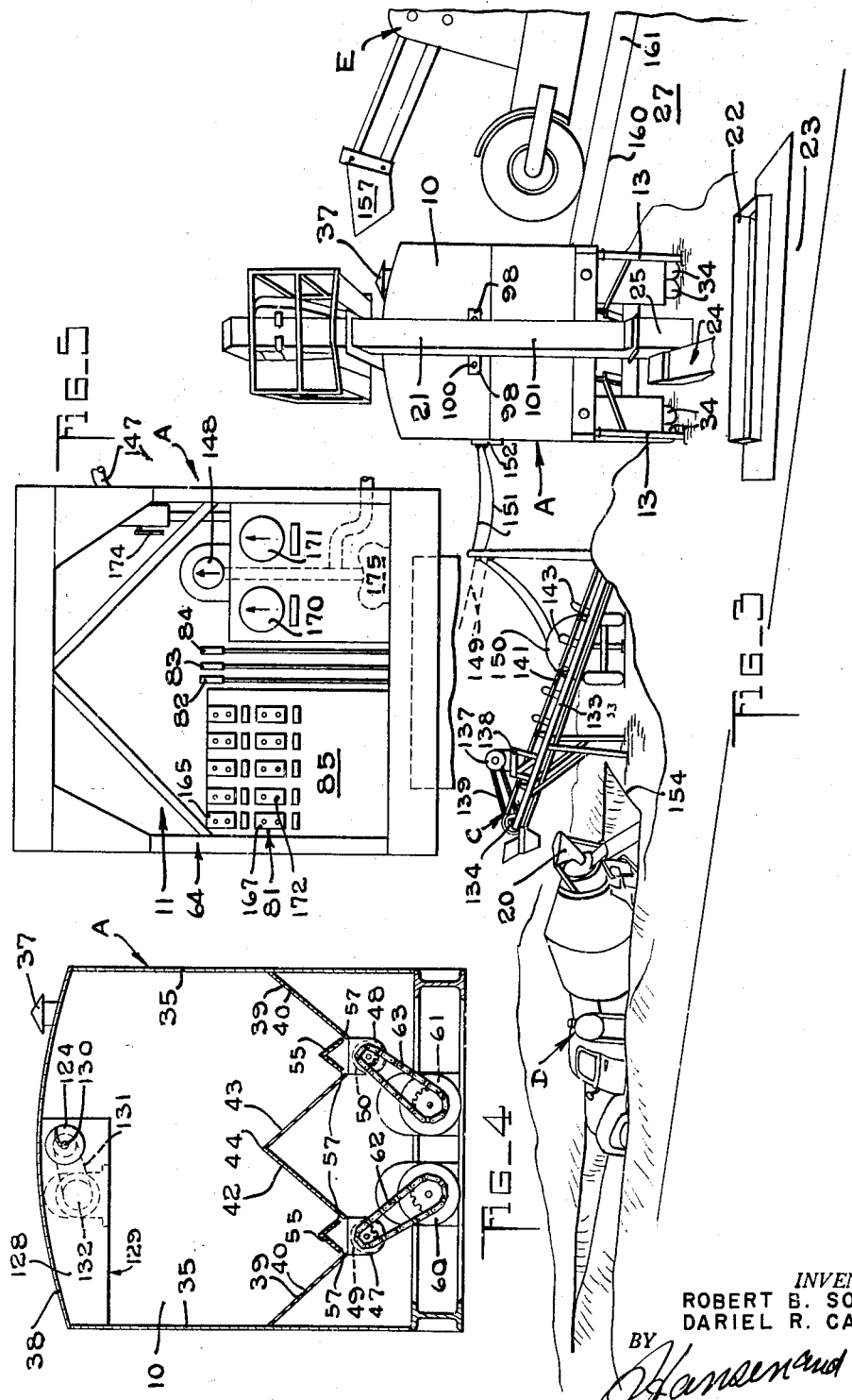

R. B. SOLDINI ET AL 2,867,336

MOBILE CONCRETE BATCHING MECHANISM

Filed March 3, 1955

INVENTORS
ROBERT B. SOLDINI
DARIEL R. CAMP
BY
ATTORNEYS

United States Patent Office 2,867,336
Patented Jan. 6, 1959

2,867,336

MOBILE CONCRETE BATCHING MECHANISM

Robert B. Soldini, Millbrae, and Dariel R. Camp, Cupertino, Calif.

Application March 3, 1955, Serial No. 491,916

2 Claims. (Cl. 214—2)

The present invention relates to concrete batching mechanism, and pertains more particularly to a mobile high-production batching mechanism for proportioning and mixing dry Portland cement, sand and aggregates.

There has been extensive development in recent years in concrete batching mechanisms. However, prior to the advent of our invention, no mobile batching mechanism had been produced which could compete in volume and cost per yard of concrete produced with the large, stationary type batching plants which have become more or less standardized where large volume batching is required.

In the large stationary batching plants, the batching materials, consisting of bulk Portland cement, said and selected sizes of gravel or crushed rock aggregate, are placed in large overhead storage bins, and are dumped by gravity from these bins into weigh batchers mounted below the bin, the cement being received in a compartment provided therefor in the weigh batcher, and the sand and coarser aggregates in another portion of the weigh batcher. These weigh batchers, which are well known in the industry, consist of hoppers mounted on scale mechanisms which indicate the weight of material in the hopper. From the weigh batchers which weigh the bulk cement, said, and various sizes of aggregates discharged therein, the material for a batch of concrete is released by controlled gates, and thence is gravitated by chutes to a conventional cement mixing machine or mixer truck located at a still lower level.

It is obvious that a batching plant with capacity to store the necessarily large quantities of these heavy, bulk materials at heights which permit their repeated transfer by gravity from one level to other successively lower levels could not easily be transported from one site to another. In fact, it is currently estimated that the cost of dismantling a standard type, large volume, stationary batching plant, transporting it a short distance, for example, twenty-five miles, and re-erecting it on a new site, will be approximately ten thousand dollars.

The cement for such stationary plants customarily is delivered in bulk to the plant in large hopper bottom bulk cement trucks which discharge their loads by gravity either into the cement storage bin of the batching plant from an elevation still higher than the bin, or into a hopper mounted at or near ground level whence the bulk cement is elevated into the cement storage bin of the plant by a conventional elevator.

It frequently has happened in the past that an owner of one of these large, stationary batching plants has bid on a job, such as a dwelling house sub-division, and, after being awarded the contract, and dismantling and moving his plant and re-erecting it on the new job site, has had the job terminate far short of the original estimate. He thereby suffers a severe loss.

On the other hand, on big jobs, the use of such a large stationary plant results in substantial savings in cost per cubic yard of cement produced, so that if the job should develop into one of large volume, the contractor would be apt to suffer a severe loss in the event he did not move the large batching plant onto the job site.

Therefore, on jobs of this marginal or uncertain nature, the bidding cement contractor is in a dilemma, and is apt to be wrong regardless of which course he decides to take in supplying cement for the job.

We now have devised a mobile batching plant which can be dismantled, moved for example twenty-five miles, and re-erected at a new site in the course of a single working day, and at a cost of but a few hundred dollars. This present plant is, however, capable of handling easily and cheaply the concrete requirements of even extremely large jobs. In fact, our new mobile plant is fully comparable both in quantity and quality of output, and cost per yard, with large stationary type batching plants.

The present invention contemplates the provision of a simple, compact, concrete batching mechanism having a trailer-mounted unit which is capable of being easily assembled with some simple accessory units to provide efficient, low cost concrete batching.

The invention also provides a simple, mobile concrete batching mechanism having facilities for continual replenishment of supplies of sand and aggregates from ground stored piles of the same at the site of the mechanism.

A further object of the invention is to provide a mobile batching plant having means for weigh-batching in large volume and at low cost, cement, sand and aggregates in proper proportions and to deliver the batches to a concrete mixer mounted adjacent the plant.

The invention further provides an improved and simplified trailer mounted unit as a core for a large output, low-cost, mobile concrete batching mechanism.

These and other novel features of our invention will be apparent from the following description and the accompanying drawings, wherein—

Fig. 1 is a side elevational view of the trailer mounted unit of a mobile batching plant as it appears when connected to a conventional truck-tractor ready for towing along a highway from one job site to another.

Fig. 2 is a perspective view of the unit shown in Fig. 1 as it appears when set up with its accessory units and in operation on a job site, the plant being shown as it appears when ready to discharge batch materials into a concrete mixer truck backed into a pit ramp.

Fig. 3 is a perpective view showing a rear elevational view of the batching plant shown in Fig. 2.

Fig. 4 is a fragmentary sectional view taken along line 4—4 of Fig. 6, upper and lower portions being removed.

Fig. 5 is a similar view taken along line 5—5 of Fig. 6.

Fig. 6 is a plan view of the assembly shown in Figs. 2 to 6 inclusive, portions being broken away.

Fig. 7 is a side elevational view of the plant shown in Fig. 6, the ground upon which the mechanism is mounted being shown sectionally.

In general, the invention comprises a trailer unit A having a large, weatherproof, bulk-cement storage bin 10 mounted on one end thereof, and having a sand and aggregate bin or hopper 11 mounted on the other end thereof.

The trailer unit A is a highway type unit, by which is meant that it is such as to permit it to be moved along a highway with adequate clearance from overhead obstructions such as utility wires and bridges, and of a width not greater than the maximum permitted for interstate highway trucks. While its length may be in excess of the legal limits in some States, a special permit may easily be secured for each move of the plant, since it may be moved empty, or practically so, and the weight will then be well within the legal limits for any State.

A folding control platform 12 is hingedly mounted on the forward end of the trailer unit A, and a plurality of extensible jack-legs 13 are provided along each side of the trailer unit. A conventional type of weigh batcher 14 is removably mounted beneath the sand and aggregate hopper 11 when the plant mechanism B is set up for operation as shown for example in Fig. 7. A usual cement compartment 15 is provided within the weigh batcher 14.

An inclined belt-type batch material conveyor C is mounted with a receiving portion 17 thereof beneath the weigh batcher 14 to receive the batch materials discharged therefrom. The conveyor C obviously may be set up so as to extend either endwise or toward either side of the trailer unit A, as desired.

A conventional collecting cone 18 is mounted on the upper, outer end of the batch materials conveyor C to guide the batch materials from the conveyor into a receiving cone 20 of a suitable concrete mixer such as the mixer truck D (Fig. 3) spotted beneath the cone 18.

An elevator 21 for elevating bulk cement into the cement bin 10 is removably mounted alongside the trailer unit A adjacent the cement storage bin 10. The bulk cement is discharged by gravity from conventional hopper-bottom bulk cement trucks G (Fig. 7) into a receiving hopper 22 embedded in the ground 23. An inclined screw conveyor 24 conveys the bulk cement from the cement receiving hopper 22 into the boot 25 of the elevator 21.

Suitable loading means such as a conventional tractor-mounted elevating scoop shovel E is provided to keep the sand and aggregate hopper 11 charged with sand and selected sizes of aggregate from piles 27 thereof stored on the ground adjacent the unit A.

Referring now to the details of the illustrated embodiment of the invention, the trailer unit A comprises an elongated trailer chassis 30 with a frame 31 and tandem rear axles 32. Dual wheels 33 and tires 34 preferably are employed so as to spread the load of the trailer unit A over as large an area of the highway surface as practicable while transporting the unit A from one site to another.

The cement storage bin 10 occupies the entire rear portion of the trailer frame 31, and extends throughout a substantial portion of its length. It is essential that this cement storage compartment should have a capacity in excess of that of the hopper bottom bulk cement trucks G to be used for hauling the cement, and preferbly has a capacity of the order of one thousand cubic feet. It should, of course, be cement-tight and weatherproof.

The cement storage bin 10 may be of any suitable type of construction, for example, a sheet or plate skin 35 of suitable material such as steel or aluminum, mounted on a suitable framework 36 which may be of steel or aluminum structural shapes. A rainproof vent 37, which preferably is provided with a dust screen, not shown, to prevent the escape of cement particles therethrough, is mounted on the bin roof 38 to permit "breathing" of the bin without loss of cement therefrom.

The bottom of the cement storage bin 10 preferably is of double-hopper construction as best shown in Fig. 4. This double hopper construction is attained by sloping inwardly the lower portion 39 of the cement bin side plates 40 by providing therebetween a pair of downwardly diverging plates 42 and 43 joined together along their line of intersection centrally of the bin 10 to provide a flat-walled ridge 44 of inverted V shape in cross section extending the entire length of the cement storage bin 10.

The lower edges of the bin side plates 40, and of the ridge plates 42 and 43 opposite thereto, are spaced apart laterally of the bin 10, and a pair of longitudinally extending troughs 47 and 48 are mounted one in the space between each ridge plate and its adjacent side plate, with the upper edges of each trough secured in dust-tight relation to the lower edges of its respective ridge and side plates. The troughs 47 and 48 have feed screws 49 and 50, respectively, mounted to extend longitudinally therein and forwardly beyond the forward end of the bin 10. The troughs 47 and 48 open at their forward ends into forwardly extending tubes 51 and 52, respectively (Figs. 1, 6 and 7), and these tubes are arranged to discharge cement passing therethrough at their forward ends into a box-like header 53, which in turn discharges the cement fed therein by the screws 49 and 50 through an extensible tube 54 into the cement compartment 15 of the weigh batcher 14.

Ridge-shaped baffles 55 of inverted V cross sectional shape are mounted one over each of the troughs 47 and 48 to support the weight of the cement in the storage hopper 10 so that it will not be transmitted directly onto the feed screws 49 and 50. The lower edges 57 of the baffles 55 are spaced upwardly from the upper edges of the troughs 47 and 48 to allow the cement in the bin 10 to feed downwardly by gravity into the troughs through these spaces.

A pair of reduction geared type drive motors 60 and 61 are mounted in the space beneath the cement bin 10, and have driving connection, by drive chains 62 and 63, with the cement feed screws 49 and 50, respectively. The sand and aggregate bin 11 is mounted on the trailer frame 31 upon a rectangular structural steel framework 64.

The illustrated sand and aggregate bin 11 is divided by partitions 67 and 68 into three hopper-like compartments 69, 70 and 71. Discharge spouts 72, 73 and 74 are provided on the compartments 69, 70 and 71 respectively, and discharge control gates 77, 78 and 79 are mounted on the lower ends of the discharge spouts 72, 73 and 74, respectively, selectively to control the discharge of sand and aggregates from the three bins.

Within the forward end of the trailer unit A, and shielded beneath the sloping front wall of the bin 11, is a control compartment 81, within which are mounted three control levers 82, 83, and 84, which selectively control the operation of the discharge gates 77, 78 and 79.

A switch panel 85 also is provided in this control compartment, and on this switch panel are mounted a plurality of conventional switches for controlling the various motors and other electrically actuated elements of the mechanism described herein.

The control platform 12 is hingedly mounted on the forward end of the trailer unit A ahead of the control compartment 81, and a railing 87 may be removably attached to the bin frame 64 to enclose the front and sides of the platform when the mechanism is set up for use as shown in Figs. 2, 3, 6 and 7. When preparing the plant mechanism B for movement from one site to another, the railing 87 is removed, and the platform 12 is swung upwardly and is secured in place against the frame 64 as shown in broken lines in Fig. 7.

Guide baffles 90, 91, 92 and 93 (Figs. 2 and 7) are mounted to extend upwardly, one from each of the front and rear walls of the bin, and one from each of the partitions 67 and 68. Each guide baffle may conveniently consist of a sheet 95 of exterior type plywood of a type customarily used for making concrete forms, secured to extend transversely between a pair of angle iron brackets 97 mounted one on each side of the bin 11 to extend upwardly therefrom. These guide baffles assist the operator of the tractor-mounted elevator scoop E in dumping the loads of sand and aggregate into their proper compartments, and also prevent spillage of these materials from one compartment into another.

The cement elevator 21 is removably secured by bolts 100 passing through aligned holes provided therefor in fittings 98 on the elevator, and fittings 99 on the rear of the cement storage bin 10, to elevate bulk cement and to discharge it into the cement storage bin 10 when the plant is set up for operation as shown in Figs. 2, 3, 6 and 7. The cement elevator 21 comprises a vertically elongated elevator housing 101 having a conventional type of bucket and chain elevator unit 102 mounted therein, The bucket-supporting elevator chain 103 of the unit 102 is trained around an upper motor-driven sprocket 104, secured to a shaft 105 journaled in the upper portion of the elevator housing 101, and around a lower idler sprocket 107 secured to a shaft 108 journaled in the boot 25 at the lower end of the housing 101.

The elevator unit 102 is driven by a conventional reduction-geared type electric motor 110, mounted on a platform 111 secured to the elevator housing 101 and having driving connection with the upper elevator sprocket shaft 105 by means of a drive chain 112.

The lower elevator sprocket shaft 108 extends laterally beyond the boot portion 25 at the lower end of the elevator housing 101 and into a laterally discharging hopper 113 mounted at one side of the elevator boot 25 and in open communication therewith. The screw type cement conveyor 24 from the bottom of the cement receiving hopper 22 discharges the cement conveyed therethrough into the laterally discharging hopper 113, whence the cement flows by gravity into the elevator boot 25 and is elevated by the elevator unit 102 and gravitates through a tube 114 into the cement storage bin 10.

The screw type cement conveyor 24 consists of a conveyor screw 119 journaled to rotate within a tubular casing 106. The screw 119 is in driven relation with the lower sprocket shaft 108 of the elevator 21 by means of a pair of meshed bevel gears 121 and 122, one of which is secured co-axially to the lower elevator sprocket shaft 118, and the other is secured co-axially to the conveyor screw 119.

The elevator buckets 102a discharge their loads of cement as they pass over the upper sprocket 104, and this cement is guided by a deflector plate 123 to gravitate through the tube 114 into the cement storage bin 10.

Directly beneath the tube 114, and extending lengthwise of the cement storage bin 10, is a cement distributing screw 124. The screw 124 is journaled at its rear end in a bearing 125 mounted on the rear wall of the bin 10, and at its forward end in a dust-proof bearing 127 mounted in the rear wall 128 of a recessed motor compartment 129 provided at the forward end of the bin 10. An axial end shaft 130 of the screw 124 extends through the motor compartment wall 128 and has driven connection by means of a drive chain 131 with a reduction-geared type electric motor 132 mounted in the motor compartment 129. The motor 132 drives the cement distributing screw 124 to move cement piled to the roof in the rear portion of the bin 10 forwardly as required to allow the bin to be filled to capacity.

The belt conveyor C for conveying the batch materials discharged from the weigh batcher 14 into the collecting cone 18 comprises a conventional structural steel frame 133 with a power driven head roller 134 at its upper end, and an idler tail roller 135 at its lower end. A reduction-geared type motor 137, mounted on a platform 138 overlying the upper end of the conveyor C, drives the head roller 134 by means of a drive chain 139.

A plurality of intermediate belt support rollers 140 are provided at spaced intervals throughout the length of the upper run of the belt 141 to support it under the load of batch materials which is carried thereon. These intermediate rollers 140 may be of the usual type to cause the upper run of the conveyor belt 141 to run in a troughed condition so as to resist lateral spillage of the batch materials therefrom. Slack support rollers 142 also may be mounted in a usual manner beneath the lower or return run of the belt.

Arched bows 143 preferably are mounted transversely over the conveyor frame 133 to span the upper run of the belt 141, and are spaced upwardly therefrom sufficiently to clear the load of batch materials carried on the belt. On windy days these bows may be covered by a strip (not shown) of canvas, forming a canopy over the belt to prevent cement from being blown out of the batch materials as they are carried along on the conveyor belt.

The collecting cone 18 at the outer end of the conveyor C is positioned to receive the batch materials as they are discharged over the head roller 134, and to funnel them into the receiving spout 20 of a mixer truck D backed into the pit ramp 154 beneath the collecting cone 18.

A water supply pipeline 147 is connected to extend from a water meter 148 mounted within view of an operator F in the control compartment 81, along the side of the conveyor frame 133. The open outer end of the pipe line 147 is directed into the collecting cone 18 to supply the water necessary for mixing with each batch of dry materials discharged into the cone 18 by the conveyor C.

Electric power for energizing the various motors and other electrically actuated units of the mechanism described herein may be provided from any suitable available source, such as an electric utility power line 149 (Fig. 3). However, in the event that commercial electric power is not available at the site where the plant is to be used, a conventional gasoline or diesel engine driven electric generator unit 150 may be provided and connected by suitable conductor wires 151 to a power input box 152 mounted at a suitable location on the trailer mounted unit A. Conventional electric wiring (not shown) is provided as required to connect the various motors and other electrically actuated units of the mechanism to the source of electrical energy through their respective control switches on the control panel 85.

In preparing a new site for setting up the batching mechanism B, it is necessary to dig a pit 153 (Fig. 7) for receiving the weigh batcher 14 and the lower end portion of the batch materials conveyor C therein. A second, larger excavation 154 also is provided to serve as a loading-ramp down which the mixer-trucks D may be backed into batch-receiving condition beneath the collector cone 18 as shown in Figs. 3 and 7.

A third, small excavation 155 also is provided to receive the substantially flush-mounted cement receiving hopper 22 and the outer end portion of the screw conveyor 24. This latter excavation is of course back-filled when the cement receiving hopper 22 and screw conveyor 24 have been mounted therein. This allows the bulk cement trucks G (Fig. 7) to drive over the cement receiving hopper 22 to dump their loads by gravity therein.

A preferred method for transferring the sand and aggregates from the ground-stored piles 27 (Figs. 2 and 3) into their respective compartments in the hopper 11, is by means of a conventional elevating loader such as the tractor-mounted elevating scoop shovel E. Since such loaders are well known, and since the details thereof are not material to the present invention, they will not be described herein.

In order to reduce the height to which the scoop 157 of the loader E must be elevated for dumping its loads of sand and aggregates into the hopper 11, a portion of the dirt removed in making the excavations 153 and 154 preferably is piled up to form the ramp 160 (Figs. 2 and 3) beside the sand and aggregate hopper 11. This ramp 160 may be paved with a concrete slab 161 if desired, or, if a relatively short run of the plant at a particular site is anticipated, the ramp may simply be covered with a layer of aggregate from the piles 27 so as to provide suitable footing for the elevating loader E.

For transporting the batching mechanism B from one site to another, the conveyor C is dismantled, if necessary, and the weigh batcher 14 with its cement compartment 15 is removed from the trailer unit A. The elevator 21 also is detached from the trailer unit A by removing the bolts 100 which connect the fittings 98 and 99 to each other.

The cement screw conveyor 24 and its cement receiving hopper 22 also are withdrawn from their buried condition, shown in Figs. 3 and 7, and are detached from each other and from the elevator boot 109. All of these detached items, consisting of the cement receiving hopper 22, the cement screw conveyor 24, the elevator 21, the batch materials conveyor C, and the weigh batcher 14 are transported to the new site by suitable transportation equipment such as a large, conventional, flat-bed highway trailer truck (not shown).

In order to clear the top of the trailer unit A for highway travel, the brackets 97 may be removed from the sand and aggregate bin frame 64, and the baffles 90, 91, 92 and 93 may be dropped into the sand and aggregate bin 11 for transportation to the new site. The air vent 17 is removed, and the vent opening therebeneath, as well as the opening for the elevator discharge tube 114, may be closed by suitable covers (not shown).

The platform railing 87 then is removed, and the control platform 12 is swung upwardly against the forward end of the sand and aggregate bin frame 64.

A conventional truck-tractor H (Fig. 1) then is coupled to the forward end of the trailer frame 31 by means of a conventional swivel plate 162 or "fifth wheel," and the jacklegs 13 are removed or retracted, as desired.

The truck H drawing the trailer unit A then may be driven along the highway to the new site, while the parts removed as described previously herein are transported to the new site by separate conveyance.

When the truck H and trailer unit A (Fig. 1) arrive at the new site, the trailer unit is towed into position with respect to the excavations 153, 154 and 155 as illustrated in Figs. 2, 3 and 7 and the various parts removed therefrom in preparing the plant for moving are reassembled with the trailer unit as shown in Figs. 2, 3, 6 and 7. This re-assembly is accomplished by reversing the steps described previously herein for preparing the mechanisms for transport.

With the plant B set up on a site as shown, for example, in Figs. 2 and 3, the operation of the plant is as follows:

A conventional hopper-bottom cement truck G is driven into position with its hopper gates 163 approximately centered over the cement receiving hopper 22. The hopper gates 163 of the truck then are opened to discharge the truck load of bulk cement into the receiving hopper 22. At this point the operator F in the control compartment 81 may close a switch 165 (Fig. 5) energizing the elevator motor 110, thereby driving the elevator unit 102, and, through the bevel gears 121 and 122, the screw conveyor 24. The screw conveyor 24 conveys the cement from the receiving hopper 22 into the elevator boot 25, whence it is elevated into the cement storage bin 10 by the elevator unit 102.

The piles 27 of sand and selected sizes of crushed rock or gravel are piled in ground storage in selected areas around the loading ramp 160 at sufficient distances from the ramp to allow the elevating loader E to maneuver.

With a supply of cement in the cement storage bin 10, and the ground stored piles 164 of sand and aggregates available, the operator of the elevating loader E charges each of the sand and aggregate compartments 69, 70 and 71 with its proper component of sand or selected size of aggregate. The capacity of the sand and aggregate hopper 11 is small compared to the size of the cement bin 10, since the major portion of the supplies of sand and aggregate is in the ground stored piles 27.

As an example of suitable capacities of the various parts of a plant having a batch capacity of 2½ cubic yards each, an elevating loader E having a scoop capacity of approximately ¾ cubic yard has been found satisfactory, and the compartments 69, 70 and 71 may have capacities of approximately two cubic yards each.

Once the compartments 69, 70 and 71 are initially charged, it is easy for the elevating loader operation to thereafter keep the compartments charged, since the capacity of each compartment is equal to several times the requirements of its particular component for each batch of concrete supplied.

When the compartments 69, 70 and 71 are properly charged with sand and aggregates, the operator F on the control platform 12 actuates a switch, for example switch 167, to energize the cement feed screw motors 60 and 61 to feed cement from the storage bin 10 into the cement compartment 15 of the weigh batcher 14.

When a required weight of cement has been thus conveyed from the storage bin 10 into the cement compartment 15, the motors 60 and 61 are de-energized, and the operator F on the control platform operates the gate control levers 82, 83 and 84, one at a time in selected sequence, to permit required amounts of sand and aggregates to flow by gravity from the bin compartments 69, 70 and 71 into the weigh batcher 14.

A conventional scale dial 170 located within sight of the operator F in the control compartment indicates the weight of the cement introduced into the cement compartment 15, and a second scale dial 171 indicates the weight of the sand and aggregate introduced into the weigh batcher 14. At this stage of the operation the conveyor C may be activated by closing a switch 174, thereby energizing the conveyor drive motor 137.

When the cement compartment 15 is charged with a desired weight of cement, and the weigh batcher 14 is charged with a selectively proportioned load of sand and aggregates, the operator F may operate a switch 172 which opens the usual gate 173 in the lower end of the weigh batcher 14 to discharge the cement and aggregates onto the conveyor belt 141. The conveyor C then is actuated by the motor 137 to carry them out and discharge them through the collecting cone 18 into the mixer truck D spotted therebeneath.

As each batch of material reaches the outer end of the conveyor C, the operator F opens a valve 174 which feeds water through the meter 148 and the pipe line 147 and discharges it into the collecting cone 18 along with the dry batch materials. The water meter 148 indicates the amount of water passing through the line 147, so that after a required amount of water for the batch has been fed into the collecting cone 18 the operator closes the valve 174 to shut off the water. The water may be supplied either under pressure from a water main if such a source of water is available, or, if not, it may be pumped from a suitable source such as a tank or reservoir, not shown, by means of a conventional water pump 175 which may be mounted in the control compartment 81.

The invention comprises a simple, compact, mobile concrete batching mechanism which may be quickly and easily erected on a desired site, and which may also be easily and quickly dismantled and moved from one site to another. Although the capacity of a mobile plant embodying the present invention is fully comparable to that of the large stationary plants of the present day, it can be moved from one site to another in a fraction of the time, and at a very small fraction of the cost of so moving one of the large stationary plants. Furthermore it can be moved along the highways of many States without the necessity of a special permit, and may be set up without requiring a building permit, a frequent strong deterrent in the erection of a permanent plant.

While we have illustrated and described a preferred embodiment of the present invention, it will be understood, however, that various changes and modifications may be made in the details thereof without departing from the spirit and scope of the invention as set forth in the appended claims.

Having thus described the invention, what we claim as new and desire to protect by Letters Patent is defined in the following claims.

We claim:

1. A mobile concrete batching mechanism comprising a trailer-type vehicle, a covered cement bin of weatherproof construction mounted on said vehicle, said cement bin having a capacity in excess of that of a predetermined size of hopper-bottom bulk cement truck, a cement receiving hopper removably mounted laterally adjacent the vehicle and positioned to receive bulk cement discharged by gravity from a hopper-bottom cement truck, enclosed, weatherproof means for elevating cement from the receiving hopper into the cement bin, means in the cement bin for distributing cement elevated thereinto by the elevating means throughout a substantial area of the cement bin, an open top, partitioned, sand and aggregate storage hopper of smaller capacity than the cement bin mounted on the vehicle alongside the cement bin and of a height convenient for filling from ground stored aggregate piles by means of a tractor mounted scoop shovel, controlled discharge gate means in the lower end of the sand and aggregate hopper, a weigh batcher removably mounted beneath the sand and aggregate hopper to receive material gravitating from said hopper through said gate means, a cement compartment mounted within the weigh batcher, a cement conveyor extending from the cement bin to a point adjacent the cement compartment of the weigh batcher, controlled actuating means mounted to drive the cement conveyor for transferring a predetermined weight of cement from the cement bin into the cement compartment of the weigh batcher, means for controlling the discharge of material from the weigh batcher, and a batch materials conveyor removably mounted beneath the weigh batcher to receive the contents of the latter when discharged therefrom and to convey said contents toward a selected delivery point.

2. A mobile concrete batching mechanism comprising a trailer-type vehicle, a cement bin of weatherproof construction mounted on said vehicle, said cement bin having a capacity for the cement requirements of a relatively large number of batches of concrete batch materials, a cement receiving hopper removably mounted laterally adjacent the vehicle and positioned to receive bulk cement discharged by gravity from a hopper-bottom cement truck, a control compartment on said vehicle, a plurality of control means mounted in said compartment, enclosed, weatherproof means for elevating cement from the receiving hopper into the cement bin, an open top sand and aggregate storage hopper mounted on the chassis alongside the cement bin, said storage hopper having a capacity for the sand and aggregate requirements of a relatively small number of batches of concrete batch materials, a controlled discharge gate in the lower end of the storage hopper, a cement and aggregate receiving weigh batcher removably mounted beneath the sand and aggregate hopper to receive aggregate gravitating from the aggregate storage hopper through the gate thereof, a cement compartment mounted within the weigh batcher, a cement conveyor extending from the cement bin to a point adjacent the cement compartment of the weigh batcher, controlled actuating means mounted to drive the cement conveyor for transferring a predetermined weight of cement from the cement bin into the cement compartment of the weigh batcher, means for controlling the discharge of material from the weigh batcher, and a batch materials conveyor removably mounted beneath the weigh batcher to receive the contents of the latter when discharged therefrom and to convey said contents toward a selected delivery point.

References Cited in the file of this patent

UNITED STATES PATENTS

| | | |
|---|---|---|
| 2,271,434 | Johnson | Jan. 27, 1942 |
| 2,310,592 | Noble | Feb. 9, 1943 |
| 2,493,898 | Pollitz | Jan. 10, 1950 |
| 2,679,322 | Martinson | May 25, 1954 |
| 2,691,455 | Bailey et al. | Oct. 12, 1954 |

FOREIGN PATENTS

| | | |
|---|---|---|
| 698,091 | Great Britain | Oct. 7, 1953 |